M. GREENBERG.
WATER HEATER.
APPLICATION FILED OCT. 5, 1907.
918,038.
Patented Apr. 13, 1909.
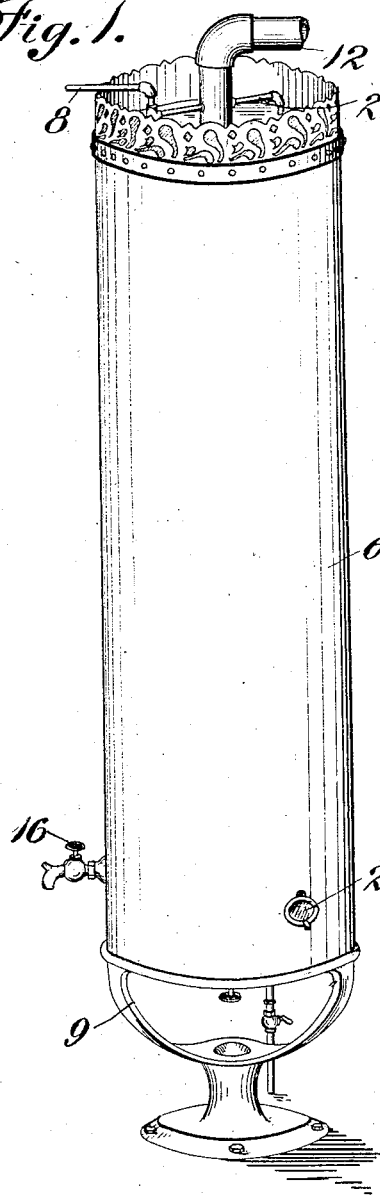
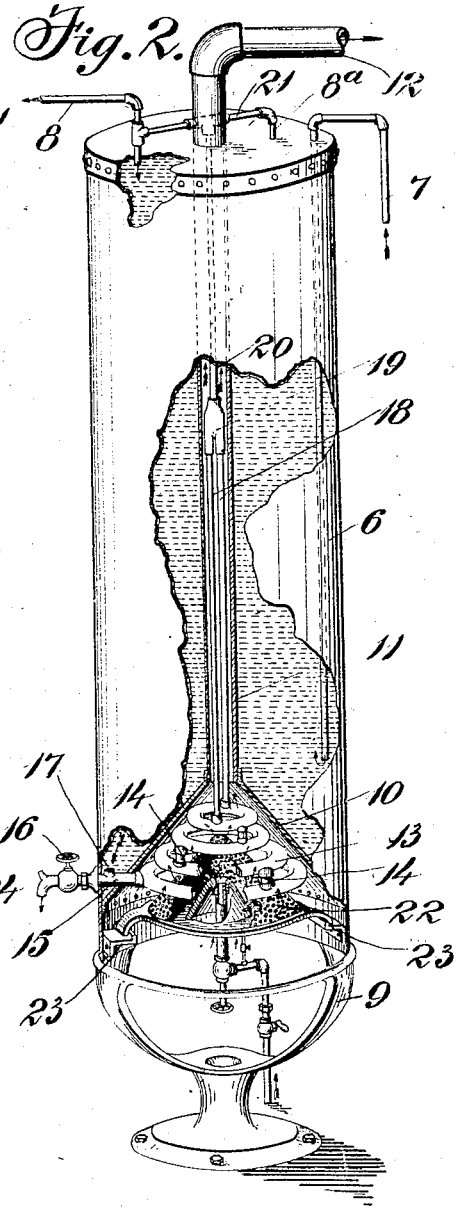
Max Greenberg, Inventor
Witnesses

UNITED STATES PATENT OFFICE.

MAX GREENBERG, OF CLEVELAND, OHIO, ASSIGNOR OF ONE-FIFTH TO EMANUEL LEVINE, ONE-FIFTH TO BEN FENIGER, ONE-FIFTH TO GEORGE P. BAER, AND ONE-FIFTH TO PETER SIMON, ALL OF CLEVELAND, OHIO.

WATER-HEATER.

No. 918,038.

Specification of Letters Patent.   Patented April 13, 1909.

Application filed October 5, 1907. Serial No. 396,067.

*To all whom it may concern:*

Be it known that I, MAX GREENBERG, citizen of the United States, residing at Cleveland, in the county of Cuyahoga and State of Ohio, have invented certain new and useful Improvements in Water-Heaters, of which the following is a specification.

This invention relates to water-heaters, and particularly to that class thereof adapted for domestic use, and including a tank in which the water is heated and from which it may be drawn by the usual service pipes.

The object of the invention is to provide a construction in which the water will be rapidly heated, the gas burner, by means of which the water is heated, being located in a conical recess under the tank, and connected to the chimney by means of a flue which extends through the tank, whereby the products of combustion are utilized to heat the water in the tank as they flow through the flue.

The invention is illustrated in the accompanying drawings, in which—

Figure 1 is a perspective view of the apparatus. Fig. 2 is a similar view partly broken away and in section.

Referring specifically to the drawings, 6 indicates a hot water tank of common construction, except as otherwise hereinafter indicated. This tank has a cold water inlet 7 and a hot water outlet 8, and it is supported upon a stand 9. The bottom of the tank is raised above the lower end of the shell and said bottom is conical, as indicated at 10, forming a conical recess which receives the heating vessel and the gas burner. From the apex of the conical bottom a pipe 11 extends upwardly and centrally through the tank and out at the top thereof, and may be extended as at 12 to a chimney. A water heating vessel 13 is located within conical recess, and it consists of a series of circular pipes connected by short vertical risers 14, the pipe rings being progressively smaller in size toward the top so as to form a conical vessel. The lowest ring is provided with an outlet pipe 15 which is provided with a faucet 16 whereby the water may be drawn off when desired. Said pipe also has an opening 17 which connects with the water space of the tank at the bottom thereto, but affords means whereby the water in the tank may be circulated into the vessel. The top ring is connected to two upwardly extending pipes 18 which extend through the flue 11, and these pipes 18 are joined by the union 19 to a single pipe 20 which extends above the top of the tank and is connected by tee and cross pipes 21 to the outlet pipe 8 and to a branch 8ª which enters through the top of the tank.

A burner 22, conical in shape, fits within or under the vessel 13, being supported by brackets 23 fixed to the shell of the tank near the lower edge thereof. The burner is located directly under the vessel and serves to heat the water therein and also to heat the water in the tank by contact of the products of combustion with the conical bottom 10 of the water tank and with the walls of the flue 11 which, as said before, extends upwardly through the center of the tank. The heat generated by the burner is therefore applied to a full extent to surfaces with which the water is in contact, and so is utilized to a maximum degree. A water circulation takes place from the tank and through the opening 17 into the vessels, and thence upwardly through the pipes 18 to the union 19 where its velocity is somewhat checked by the conflict of force, and the water then rises through the pipe 20 and thence through the pipe 21 to the pipes 8 and 8ª and downwardly into the tank. The side wall of the tank is conveniently provided with a door 24, having a window of mica therein, through which the burner can be seen and lighted.

I claim:

A water heater comprising a tank having a vertical flue through the same, a water heating vessel at the bottom of the flue and connected to the lower end of the tank, a plurality of upright pipes extending upwardly from the vessel, in the flue, a single pipe located in the upper part of the flue and connected by a union to said pipes and leading into the upper end of the tank, and a burner under the vessel.

In testimony whereof I do affix my signature, in presence of two witnesses.

MAX GREENBERG.

Witnesses:
JOHN A. BOMMHARDT,
EDITH D. COMER.